(No Model.) 2 Sheets—Sheet 1.

S. GARWOOD.
VELOCIPEDE.

No. 435,493. Patented Sept. 2, 1890.

WITNESSES:
John H. Fravel
Barton Griffith

INVENTOR:
Spencer Garwood

BY C. C. Shepherd
ATTORNEY.

(No Model.) 2 Sheets—Sheet 2.

S. GARWOOD.
VELOCIPEDE.

No. 435,493. Patented Sept. 2, 1890.

WITNESSES:
Jno. H. Fravel.
Barton Griffith

INVENTOR:
Spencer Garwood
BY
C. C. Shepherd
ATTORNEY.

UNITED STATES PATENT OFFICE.

SPENCER GARWOOD, OF MILFORD CENTRE, OHIO.

VELOCIPEDE.

SPECIFICATION forming part of Letters Patent No. 435,493, dated September 2, 1890.

Application filed January 10, 1890. Serial No. 336,506. (No model.)

*To all whom it may concern:*

Be it known that I, SPENCER GARWOOD, a citizen of the United States, residing at Milford Centre, in the county of Union and State of Ohio, have invented a certain new and useful Improvements in Vehicles, of which the following is a specification.

My invention relates to improvements in vehicles adapted to be drawn forward by a horse or other animal or propelled in any suitable and desirable manner.

The objects of my invention are to provide a construction in vehicles by which the friction is reduced to the minimum, to so construct and arrange the parts that the weight of the carriage and its occupants is distributed so as to secure the best possible results in the propulsion of the vehicle, and to permit the same to pass easily over rough and uneven surfaces, obstacles, or obstructions without damage to the operating parts.

My invention consists in the constructions and combinations of parts hereinafter described, and set forth in the claims.

Figure 1:
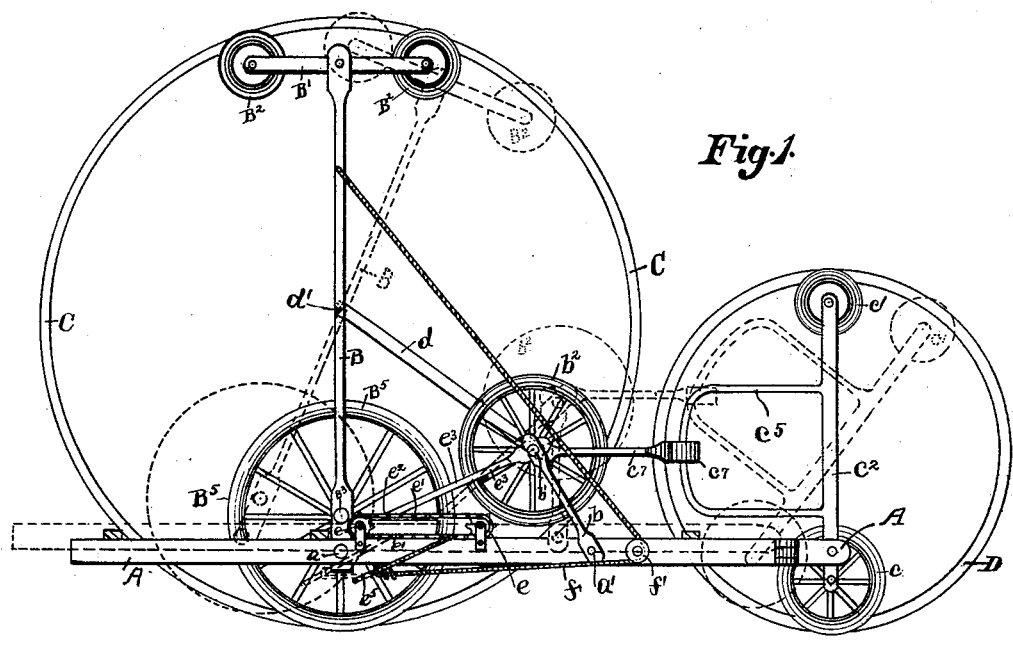
Figure 2:
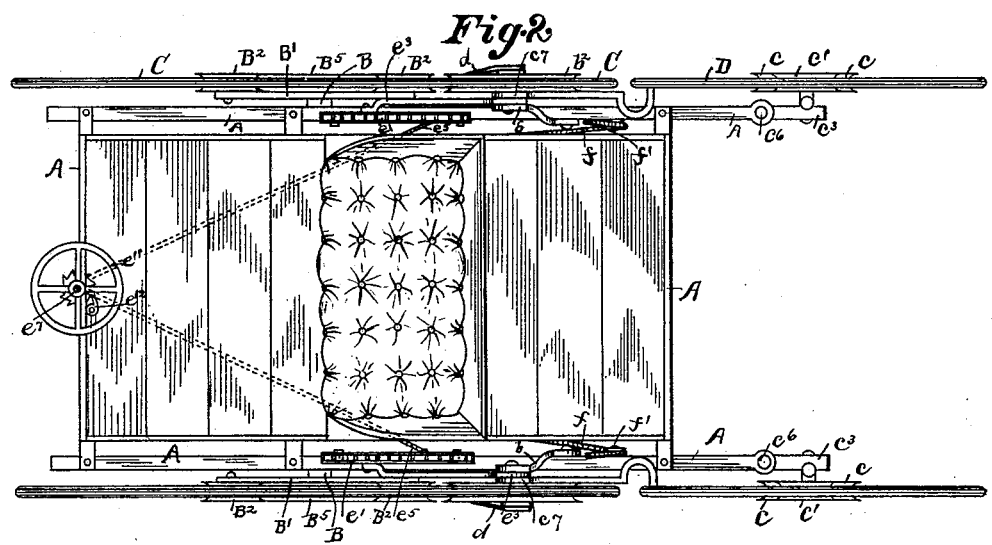
Figure 3:
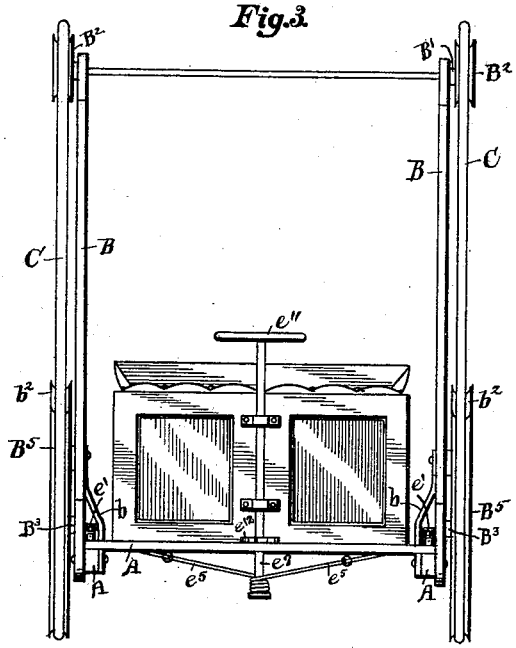

In the accompanying drawings, Figure 1 is a longitudinal sectional view, in elevation, of a device embodying my invention. Fig. 2 is a plan view, and Fig. 3 is a front elevation, of the same.

Like parts are represented by similar letters of reference throughout the several views.

In the accompanying drawings, A A represent the side bars of the main frame or body of a vehicle. Pivoted to the sides of the frame A, at $a$, is a diameter-arm B, which carries at its upper extremity a cross-bar B′, to which are journaled friction or bearing wheels $B^2$. Journaled on the arm B on a suitable spindle $B^3$ is a supporting-wheel $B^5$. These supporting and bearing wheels $B^2$, $B^2$, and $B^5$ are each suitably grooved on their periphery or provided with side flanges adapted to fit over a large traveling ring or wheel C, which may be provided on its inner side with an inside tire of rubber. This ring or wheel C is preferably made of rounded iron or steel, and travels on the ground as the vehicle is propelled.

Pivoted to the side of the frame A, at $a'$, are small supporting-arms $b$, provided at their outer extremities with suitable journals $b'$, on which are adapted to turn lock-wheels $b^2$, also provided with grooved or flanged peripheries adapted to engage with and travel within the ground rings or wheels C.

Immediately following the large ground or traveling wheels C, I provide a smaller pair of traveling wheels D, in which are arranged bearing-wheels $c$ and $c'$, grooved on their periphery and adapted to fit within the ground or traveling wheel D and supported at the extremities of a pivoted arm $c^2$. Each of these arms $c^2$ is pivoted to a projection $c^3$, forming an extension of and pivoted at $c^6$ to the main frame A.

The supporting diameter-arm $c^2$ is provided at one side with a loop-guide or bale-guard $c^5$, which passes loosely through the end connecting-link $c^7$, which is attached or connected at its other end to the spindle or trunnion $b'$ of the lock-wheel $b^2$. By this construction it will be seen that the carriage body or frame A A is supported at each side on the bearing and supporting wheels, which travel within the ground or traveling wheels. The rear ground or traveling wheels D are adapted to track with the forward ground-wheels when the vehicle is traveling in a straight line, and adapted to assume an angular position with reference to the forward traveling-wheels when the vehicle is changing direction, the bearing and supporting wheels in the front and rear ground-wheels being connected together through the medium of the frame, as well as the connecting-links $c^7$.

To provide a more rigid connection for the supporting-arm B, to insure the proper tracking of the respective lock and supporting wheels, I provide a brace-connection $d$, which is pivoted to the supporting-arm B at the center of its height, as shown at $d'$, and connected at the other end to the trunnion or spindle $b'$ of the lock-wheel $b^2$ or to side bars A for a two-wheeled vehicle, the point $d'$ being located at the center of the ground or traveling wheel C.

On each side of the frame A, I provide suitable supporting or sprocket wheels $e\ e$, over which I pass a suitable belt or chain $e'$, and to one side of this belt or chain I attach, by means of a suitable projection $e^2$, a connecting-bar $e^3$. This connecting-bar $e^3$ is pivoted at its other end to the trunnion $b'$. Extending from each of the endless chains $e'$ are operating ropes or chains $e^5$, which are connected to the endless chains $e'$ on the opposite side of the supporting-wheels from the bar $e^3$. These operating-ropes $e^5$ are connected at their opposite ends to a shaft $e^7$, by which they are adapted to be wound, the said shaft $e^7$ being provided with a suitable hand-wheel $e^{11}$ and a pawl and ratchet $e^{12}$, and being journaled vertically in the forward end of the vehicle frame or body, as shown.

Connected to each of the operating ropes or chains $e^5$, at a point between the shaft $e^7$ and the endless chain $e'$, I attach a rope or cord $f$, which extends over a suitable bolt or sheave $f'$ on the frame A A, and is attached to the supporting-arm B above the brace-connection $d$. By the construction as thus described when the vehicle is drawn forwardly a revolution of the shaft $e^7$ will cause the operating-ropes $e^5$ to be wound thereon, which will in turn revolve the endless chains $e'$ upon their supporting-wheels and force the lock-wheels $b^2$ upwardly and backwardly in the forward ground-wheel C. These bearing-wheels $b^2$ being pivotally connected to the frame and supporting-arm B will aid the said frame to be elevated and thrown forward, as indicated in dotted lines. The diameter-arms B and $c^2$ being pivoted to the frame and to the supporting-wheels $B^5$ and $b^2$, respectively, at different points, the said supporting-wheels will be moved forwardly and upwardly within the respective ground-wheels, which will carry the bearing-wheels $B^2$ and $c'$ backwardly and downwardly in said ground-wheels, as indicated in dotted lines in Fig. 1. In this position the vehicle is adapted to be operated, propelled forwardly by suitable means connected to the vehicle or drawn by any suitable motive power. The weight of the frame and vehicle is thus brought against the rim of the respective ground-wheels in front of a vertical line passing through the center thereof and at some distance above the contact-point between the bearing-wheels and the said ground-wheels. The respective parts will be retained in this position by the arrangement of the respective pivoted arms and the connecting-chains, together with the lock or bearing wheels $b^2$, which press against the opposite side of the forward ground-wheels C. In this position the weight of the vehicle will be supported within the respective ground-wheels at different points on opposite sides of the center of the contact-points. These ground-wheels from their nature and construction have a certain amount of flexibility, which will prevent the transmission of shock or jar occasioned from traversing rough or uneven surfaces to the frame or vehicle-body. This position of the parts will also bring the weight of the vehicle in such position on the ground-wheels as to offer the least resistance in the propulsion of the vehicle, and to aid rather than retard the same.

It is obvious that instead of cross-bars B' and the bearing-wheels $B^2$ $B^2$ a single bearing-wheel may be pivoted to the extremity of the supporting-arm B, the same as in the rear ground-wheel. Other modifications may be made without departing from the spirit of my invention. If desired, the frame side bars A may be connected with the diameter-bars $c^2$ below the centers of the wheels $c$.

Having now fully described my invention, what I claim, and desire to secure by Letters Patent, is—

1. The combination, with a ground-wheel having the internal traveling, bearing, and supporting wheels, as described, journaled on the supporting-arm pivoted to the main frame, of an endless chain supported on said frame and connected to one of said bearing-wheels, and means for operating said chain to force said bearing-wheels against the inner periphery of the ground-wheel, substantially as specified.

2. The combination, with the main frame and ground-wheel, of the pivoted arms B and $b$, having the supporting-wheels $B^5$ and $b^2$ journaled thereon and adapted to travel in said ground-wheel, a bearing-wheel on one of said arms, also traveling in said ground-wheel diametrically opposite one of said supporting-wheels, and a brace connecting the respective supporting-arms, the said brace being pivoted to one of said arms at the center of the ground-wheel, substantially as specified.

3. The combination, with a vehicle, of a front ground-wheel having the supporting and bearing wheels, as described, and a rear ground-wheel also provided with suitable supporting and bearing wheels, the supporting and bearing wheels in the rear ground-wheel being so connected to the vehicle-frame as to permit the rear ground-wheel to assume an angular position with reference to the front ground-wheel, substantially as specified.

4. The combination, with the main frame, of the ground-wheels C, supporting-arms B and $b$, supporting-wheels $B^5$ and $b^2$, brace connections $d$, endless chains $e'$, connecting-bar $e^3$, operating-ropes $e^5$ and $f$, and the hand-wheel $e$, arranged and operated substantially as specified.

5. The combination, with the main frame having the forward ground-wheels, pivoted supporting-arms, and internal bearing and supporting wheels, as described, of the rear ground-wheel having a supporting-arm with bearing and supporting wheels, said arm being provided with a yoke pivotally connected to one of the supporting wheels of the front ground-wheel, substantially as specified.

SPENCER GARWOOD.

In presence of—
WILLIAM DIEHL,
JON. J. GABRIEL.